Dec. 6, 1955  H. N. BAKER  2,726,089
SEED DISTRIBUTOR
Filed Nov. 3, 1953

Herbert N. Baker
INVENTOR.

United States Patent Office 2,726,089
Patented Dec. 6, 1955

2,726,089

SEED DISTRIBUTOR

Herbert N. Baker, Central City, Ky.

Application November 3, 1953, Serial No. 389,919

2 Claims. (Cl. 275—8)

The present invention relates to new and useful improvements in machines for the sowing of seed by a broadcast action, and more particularly to a rotary seed distributor.

An important object of this invention is to provide a seed or fertilizer distributor for the broadcasting of seed by the resultant velocity imparted thereto by centrifugal force and by the tangential velocity of rotating broadcasting tubes and embodying means for regulating the direction in which the seed is broadcast with respect to the direction of travel of the machine on which the distributor is mounted.

A further object is to provide a seed distributor capable of being operated by power take-off means of a tractor, or by an independent power source in order that the sowing may continue when the tractor is not running, or wherein the distributor may be carried by a person and hand operated.

Another object is to provide a device of this character of simple and practical construction, which is efficient and reliable in operation, relatively inexpensive to manufacture and otherwise well adapted for the purpose for which the same is intended.

Other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
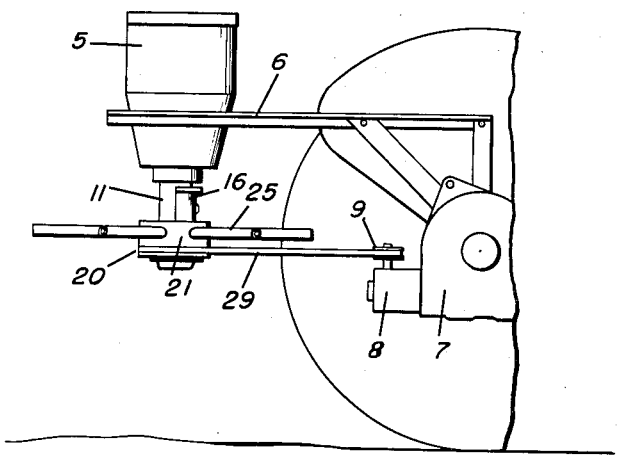
Figure 1 is a side elevational view.
Figure 2:
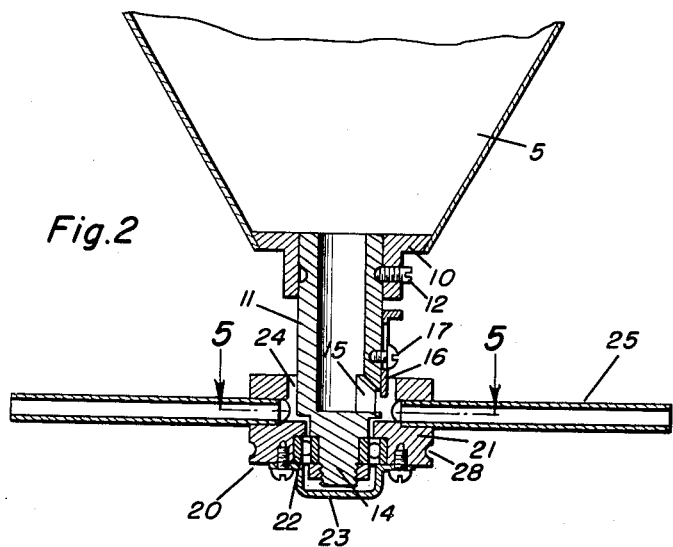
Figure 2 is an enlarged vertical sectional view.
Figure 3:
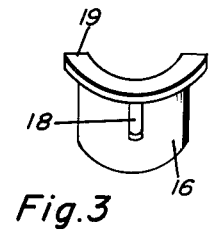
Figure 3 is an enlarged perspective view of the regulating valve for the distributor.
Figure 4:
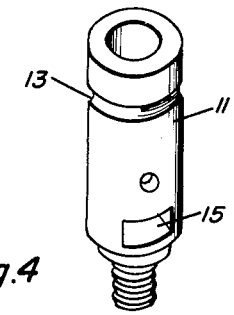
Figure 4 is a similar view of the adjustable seed distributing chamber for controlling the direction of broadcast of the seed.
Figure 5:
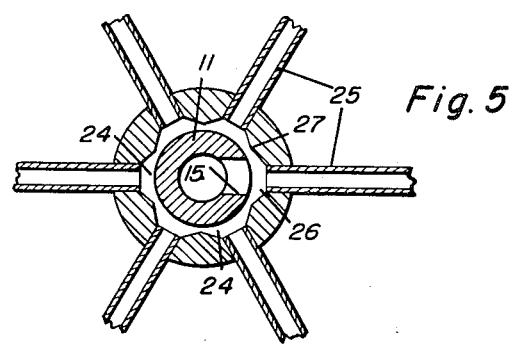
Figure 5 is a transverse sectional view taken on a line 5—5 of Figure 2.

Referring now to the drawing in detail wherein for the purpose of illustration I have disclosed a preferred embodiment of the invention, the numeral 5 designates a seed hopper, which may be mounted on a frame or bracket 6 at the rear of a tractor 7 provided with a power takeoff 8 for driving a pulley 9.

A collar or sleeve 10 is secured in the lower end of hopper 5 and in which a cylindrical seed distributing chamber 11 is secured by means of a set screw 12 carried by the collar 10 and engaged in a circumferential groove 13 in the chamber 11 to secure the latter in rotatably adjusted position at the lower end of the hopper.

The lower end of chamber 11 is closed by an externally threaded stem 14 and the lower portion of the chamber above the stem 14 is formed with a discharge opening 15. A regulator valve or plate 16 of arcuate construction is slidably mounted for vertical adjustment over the opening 15 by means of a screw 17 engaged in a vertical slot 18 in the valve or plate 16 to secure the latter in vertically adjusted position on the chamber 11. The upper end of the valve or plate 16 is formed with an outwardly projecting finger gripping flange 19.

A rotary distributor is designated generally at 20 and comprises a hub 21 which is rotatably mounted on the lower portion of the chamber 11 by means of a ball-bearing assembly 22. A dust cap or cover 23 is secured to the bottom of the hub 21 to enclose the bearing assembly. The upper portion of hub 21 is formed with an internal annular chamber 24 to space the hub from the chamber 11 and to accommodate the lower end of the valve or plate 16. Seed from the chamber 11 enters the chamber 24 by way of the discharge opening 15. A plurality of seed distributor tubes 25 project radially from hub 21 and into the inner ends of which the seed flows from the chamber 24. The chamber 24 in the region of the inner end of each tube 25 is flared, as shown at 26, and the adjacent flared portions 26 of chamber 24 are partially separated from each other by internal tapered ribs 27 to restrict the free passage of seed from one flared portion 26 of the chamber 24 to adjacent flared portions and to prevent binding or jamming of the seed in the chamber 24 during the rotation of the distributor 20.

The lower portion of hub 21 is formed with a circumferential groove 28 to form a pulley to be driven by a belt 29 from the pulley 9 of the tractor.

In the operation of the device, the chamber 11 is rotatably adjusted in the collar 10 of hopper 5 to locate the discharge opening 15 at a desired direction in which the seed is to be distributed. As hub 21 of the seed distributor 20 is rotated, the seed from chamber 11 will enter the flared portions 26 of chamber 24 in the hub 21 to thus enter the tube 25 and the seed is then distributed by the resultant velocity imparted thereto by centrifugal force and by the tangential velocity of the rotating distributor tubes. Each tube is supplied with the seed as the same passes across the discharge opening 15 of the chamber 11.

While the present embodiment of the invention illustrates the hopper 5 supported on a tractor and the rotary distributor 20 power operated, it will be understood that the device may be carried by hand and the distributor 20 manually operated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A seed distributor comprising a hopper, a vertical cylindrical seed chamber rotatably mounted at the lower end of the hopper and having a discharge opening at its lower side portion, means locking the chamber in rotatably adjusted position to face the opening in a predetermined direction, and a rotary distributor mounted at the lower end of the chamber and into which seed is fed from the opening, said distributor comprising a hub having an internal chamber arranged to receive the seed, a plurality of distributing tubes extending radially from the chamber of the hub, and partitioning means internally of the last-named chamber between adjacent tubes to confine flow of seed to a single tube as they successively register with the discharge opening.

2. A seed distributor comprising a hopper, a vertical cylindrical seed chamber rotatably mounted at the lower end of the hopper and having a discharge opening at its lower side portion, means locking the chamber in rotatably adjusted position to face the opening in a predetermined direction, and a rotary distributor mounted at the lower end of the chamber and into which seed is fed from the opening, said distributor including a hub having an annular chamber surrounding the lower portion of the cylindrical chamber, radially projecting tubes leading from the annular chamber, and radially inwardly projecting tapering ribs in said annular chamber and separating the tubes to confine flow of the seed from the discharge opening to a single tube as they successively register with the opening.

References Cited in the file of this patent

UNITED STATES PATENTS

| | | |
|---|---|---|
| 802,230 | Moss | Oct. 17, 1905 |
| 1,019,609 | Derdeyn | Mar. 5, 1912 |
| 1,107,992 | Parrish | Aug. 18, 1914 |
| 1,938,669 | Smith | Dec. 12, 1933 |
| 2,550,303 | Simpson | Apr. 24, 1951 |